United States Patent
Sandler (10) Patent No.: US 9,977,567 B2
(45) Date of Patent: May 22, 2018

(54) GRAPHICAL USER INTERFACE

(71) Applicant: Google Inc., Mountain View, CA (US)

(72) Inventor: Daniel Robert Sandler, Burlington, MA (US)

(73) Assignee: Google LLC, Mountain View, CA (US)

(*) Notice: Subject to any disclaimer, the term of this patent is extended or adjusted under 35 U.S.C. 154(b) by 207 days.

(21) Appl. No.: 14/066,628

(22) Filed: Oct. 29, 2013

(65) Prior Publication Data

US 2014/0123059 A1 May 1, 2014

Related U.S. Application Data

(60) Provisional application No. 61/719,951, filed on Oct. 29, 2012.

(51) Int. Cl.
*G06F 3/0481* (2013.01)
*G06F 3/0488* (2013.01)

(52) U.S. Cl.
CPC ...... *G06F 3/04817* (2013.01); *G06F 3/04886* (2013.01); *G06F 2203/04803* (2013.01)

(58) Field of Classification Search
CPC ... G06Q 10/107; H04L 61/1564; H04L 51/22; H04L 12/58
See application file for complete search history.

(56) References Cited

U.S. PATENT DOCUMENTS

| | | | |
|---|---|---|---|
| 2007/0250786 A1* | 10/2007 | Jeon | G06F 3/0482 715/765 |
| 2008/0082934 A1* | 4/2008 | Kocienda | G06F 3/04886 715/773 |
| 2010/0295797 A1 | 11/2010 | Nicholson et al. | |
| 2011/0083104 A1* | 4/2011 | Minton | G06F 3/04886 715/815 |

(Continued)

FOREIGN PATENT DOCUMENTS

| | | | |
|---|---|---|---|
| EP | 2418574 A2 | | 2/2012 |
| JP | 2004-086790 | * | 3/2004 |
| JP | 2004-86790 A | | 3/2004 |

OTHER PUBLICATIONS

Rob Clymo, How to set time, date and password on an Android tablet, Apr. 19, 2011, PC Advisor, 5 pages.*

(Continued)

*Primary Examiner* — Kevin L Young
*Assistant Examiner* — Parmanand D Patel
(74) *Attorney, Agent, or Firm* — Colby Nipper (57) ABSTRACT

The disclosed technology includes controlling the differentiation of gestures in a graphical user interface (GUI). In one implementation, a GUI has a first region including a first interactive user interface object, a second region including a second interactive user interface object, and a third region without any interactive user interface objects. The method can include receiving an indication of a first input at the first user interface object within the first region, and increasing, (Continued)

in response and for a dwell time, a size of the third region, wherein the resized third region overlays a portion of the second region. After resizing, the GUI may decline to perform an action associated with the second user interface object in the second region when a second input is received near the second user interface object and within the resized third region.

20 Claims, 5 Drawing Sheets

(56) References Cited

U.S. PATENT DOCUMENTS

| | | |
|---|---|---|
| 2012/0105481 A1 | 5/2012 | Baek et al. |
| 2012/0144338 A1* | 6/2012 | Hymel ............... G06F 3/04842 715/773 |
| 2013/0044061 A1* | 2/2013 | Ashbrook ............ G06F 3/0488 345/173 |

OTHER PUBLICATIONS

PCT/US2013/067248 International Search Report and Written Opinion, dated Apr. 7, 2014.
"International Preliminary Report on Patentability", Application No. PCT/US2013/067248, May 14, 2015, 16 pages.

\* cited by examiner

- 401 — OUTPUT, BY A COMPUTING DEVICE AND FOR DISPLAY, A FIRST REGION, A SECOND REGION AND A THIRD REGION OF A GRAPHICAL USER INTERFACE, WHEREIN THE THIRD REGION IS INTERPOSED BETWEEN THE FIRST REGION AND THE SECOND REGION, THE FIRST REGION INCLUDES A FIRST USER INTERFACE OBJECT, THE SECOND REGION INCLUDES A SECOND USER INTERFACE OBJECT, AND THE THIRD REGION DOES NOT HAVE ANY USER INTERFACE OBJECTS

- 405 — RECEIVE, BY THE COMPUTING DEVICE, AN INDICATION OF A FIRST INPUT RECEIVED SUBSTANTIALLY WITHIN THE FIRST REGION

- 407 — INCREASE, IN RESPONSE TO RECEIVING THE INDICATION OF THE FIRST INPUT AND FOR A FIRST DWELL TIME, A SIZE OF THE THIRD REGION, WHEREIN THE THIRD REGION OVERLAYS A PORTION OF THE SECOND REGION

- 409 — RECEIVE, BY THE COMPUTING DEVICE, AN INDICATION OF A SECOND INPUT RECEIVED NEAR THE SECOND USER INTERFACE OBJECT OF THE SECOND REGION AND SUBSTANTIALLY WITHIN THE THIRD REGION

- 411 — DETERMINE, IN RESPONSE TO RECEIVING THE INDICATION OF THE SECOND INPUT, NOT TO PERFORM AN ACTION ASSOCIATED WITH THE SECOND USER INTERFACE OBJECT OF THE SECOND REGION

```
┌─────────────────────────────────────────────┐
│ OUTPUT, BY A COMPUTING DEVICE AND FOR       │
│ DISPLAY, A FIRST REGION, A SECOND REGION AND│
│ A THIRD REGION OF A GRAPHICAL USER INTERFACE,│ ⟋ 501
│ WHEREIN THE THIRD REGION IS INTERPOSED      │
│ BETWEEN THE FIRST REGION AND THE SECOND     │
│ REGION, THE FIRST REGION INCLUDES A FIRST   │
│ USER INTERFACE OBJECT, THE SECOND REGION    │
│ INCLUDES A SECOND USER INTERFACE OBJECT,    │
│ AND THE THIRD REGION DOES NOT HAVE ANY      │
│ USER INTERFACE OBJECTS                      │
└─────────────────────────────────────────────┘
                      ▼
┌─────────────────────────────────────────────┐
│ RECEIVE, BY THE COMPUTING DEVICE, AN        │ ⟋ 505
│ INDICATION OF A FIRST INPUT RECEIVED        │
│ SUBSTANTIALLY WITHIN THE FIRST REGION       │
└─────────────────────────────────────────────┘
                      ▼
┌─────────────────────────────────────────────┐
│ INCREASE, IN RESPONSE TO RECEIVING THE      │
│ INDICATION OF THE FIRST INPUT AND FOR A     │ ⟋ 507
│ FIRST DWELL TIME, A SIZE OF THE THIRD       │
│ REGION, WHEREIN THE THIRD REGION OVERLAYS   │
│ A PORTION OF THE SECOND REGION              │
└─────────────────────────────────────────────┘
                      ▼
┌─────────────────────────────────────────────┐
│ RECEIVE, BY THE COMPUTING DEVICE, AN        │
│ INDICATION OF A SECOND INPUT RECEIVED NEAR  │ ⟋ 509
│ THE SECOND USER INTERFACE OBJECT OF THE     │
│ SECOND REGION AND SUBSTANTIALLY WITHIN THE  │
│ THIRD REGION                                │
└─────────────────────────────────────────────┘
                      ▼
┌─────────────────────────────────────────────┐
│ DETERMINE, IN RESPONSE TO RECEIVING THE     │
│ INDICATION OF THE SECOND INPUT, NOT TO      │ ⟋ 511
│ PERFORM AN ACTION ASSOCIATED WITH THE       │
│ SECOND USER INTERFACE OBJECT OF THE SECOND  │
│ REGION                                      │
└─────────────────────────────────────────────┘
                      ▼
┌─────────────────────────────────────────────┐
│ DECREASE, AFTER THE FIRST DWELL TIME, THE   │ ⟋ 513
│ SIZE OF THE THIRD REGION                    │
└─────────────────────────────────────────────┘
```

GRAPHICAL USER INTERFACE

CROSS-REFERENCE TO RELATED APPLICATIONS

This application claims priority to and the benefit of U.S. Provisional Patent Application No. 61/719,951, filed Oct. 29, 2012, the contents of which are hereby incorporated by reference in their entirety.

BACKGROUND

User interfaces allow a human user to interact with a system or device and thereby control and/or receive feedback from the system or device. Examples of this broad concept include the interactive use of an operating system on a computing device. The design of a user interface may affect the usability of the system, such as an amount of effort a user expends to effectively control the system and to receive feedback from the system. A graphical user interface (GUI) is a form of user interface that can both accept user input and provide a graphical output to a display.

Because GUIs output on presence-sensitive displays of mobile computing devices are typically small and compact, the use and operation of such GUIs is prone to input errors, for example, when a user attempts to select an object located on a very small or crowded region within a GUI. Reducing input errors can improve the speed and efficiency of GUI operations and improve the user experience by reducing user frustration resulting from inadvertent actions.

SUMMARY OF THE DISCLOSURE

There is a need for techniques to improve the usability of a computing device by reducing input entry errors in a graphical user interface output at a display of the computing device. Furthermore, other desirable features and characteristics of the present disclosure will become apparent from the subsequent detailed description and claims, taken in conjunction with the accompanying figures and the foregoing technical field and background.

The subject technology relates to methods, devices, systems, or articles of manufacture for reducing entry errors in a graphical user interface. A computing device may output, for display, a first region, a second region, and a third region of a graphical user interface. The third region may be interposed between the first region and the second region. Further, the first region may include a first user interface object and the second region may include a second user interface object. Also, the third region may not have any user interface objects. The computing device may receive an indication of a first input received substantially within the first region. The computing device may increase, in response to receiving the indication of the first input and for a first dwell time, a size of the third region. The third region may overlay a portion of the second region. Further, the computing device may receive an indication of a second input received near the second user interface object of the second region and substantially within the third region. The computing device may determine, in response to receiving the indication of the second input, not to perform an action associated with the second user interface object of the second region.

BRIEF DESCRIPTION OF THE FIGURES

The present disclosure is illustrated by way of example implementations and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate example implementations and the like, and explain various principles and advantages, in accordance with the present disclosure, where.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various example implementations and the like, which may be described herein in terms of functional or logical block elements. Various techniques described herein may be used to perform configurable gestures in a graphical user interface. The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the following description, numerous specific details are set forth. However, it is to be understood that implementations of the disclosed technology may be practiced without these specific details. References to "one implementation," "an implementation," "example implementation," "various implementations," and other like terms indicate that the implementations of the disclosed technology so described may include a particular function, feature, structure, or characteristic, but not every implementation necessarily includes the particular function, feature, structure, or characteristic. Further, repeated use of the phrase "in one implementation" does not necessarily refer to the same implementation, although it may.

In some instances, a graphical user interface may be referred to as an object-oriented user interface, an application oriented user interface, a web-based user interface, a touch-based user interface, or a virtual keyboard.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, the presence-sensitive display can enable a user to interact directly with what is displayed, rather than indirectly via a pointer controlled by a mouse or touchpad. Secondly, the presence-sensitive display can enable a user do so without requiring any intermediate device that would need to be held in the hand. Such displays may be attached to computers, or to networks as terminals. Such displays can also play a prominent role in the design of digital appliances such as the personal digital assistant (PDA), satellite navigation devices, mobile phones, and video games.

In some instances, a computing device may be referred to as a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

This disclosure provides example methods, devices, systems, or articles of manufacture for reducing entry errors in a graphical user interface. By configuring a computing device in accordance with various aspects described herein, increased usability of the computing device is provided. In one example, a user, in typing on a virtual keyboard on a touchscreen, may accidentally contact a portion of a presence-sensitive display at or near where a system icon is currently displayed. In some implementations, instead of determining that the system icon was selected and therefor exiting the virtual keyboard, the computing device may ignore the touch near the system icon or associate the touch with a key of the virtual keyboard. To achieve this, the computing device may dynamically increase the size of a dead zone interposed between the virtual keyboard and the system icon to make it more difficult to select the system icon. Further, the computing device may increase the size of the dead zone for a limited time immediately following the selection of a key on the virtual keyboard.

In another example, a user, in playing a game on a touchscreen, may accidentally contact the touchscreen at or near a location at which a system icon is displayed. In some implementations, instead of determining that the system icon was selected and exiting the game, the computing device may ignore the touch near the system icon or associate the touch with a user interface object of the game. To achieve this, the computing device may dynamically increase the size of a dead zone interposed between the game and the system icon to make it more difficult to select the system icon. Further, the computing device may increase the size of the dead zone for a limited time immediately following the selection of a user interface object associated with the game.

In a further example, a user, in using an application on a touchscreen, may accidentally touch on the touchscreen at or near a location at which a system icon is displayed. Instead of determining that the system icon was selected and exiting the user from the application, the computing device may ignore the touch near the system icon or associate the touch with a user interface object of the application. To achieve this, the computing device may dynamically increase the size of a dead zone interposed between the application and the system icon to make it more difficult to select the system icon. Further, the computing device may increase the size of the dead zone for a limited time immediately following the selection of a user interface object associated with the application.

Figure 1:
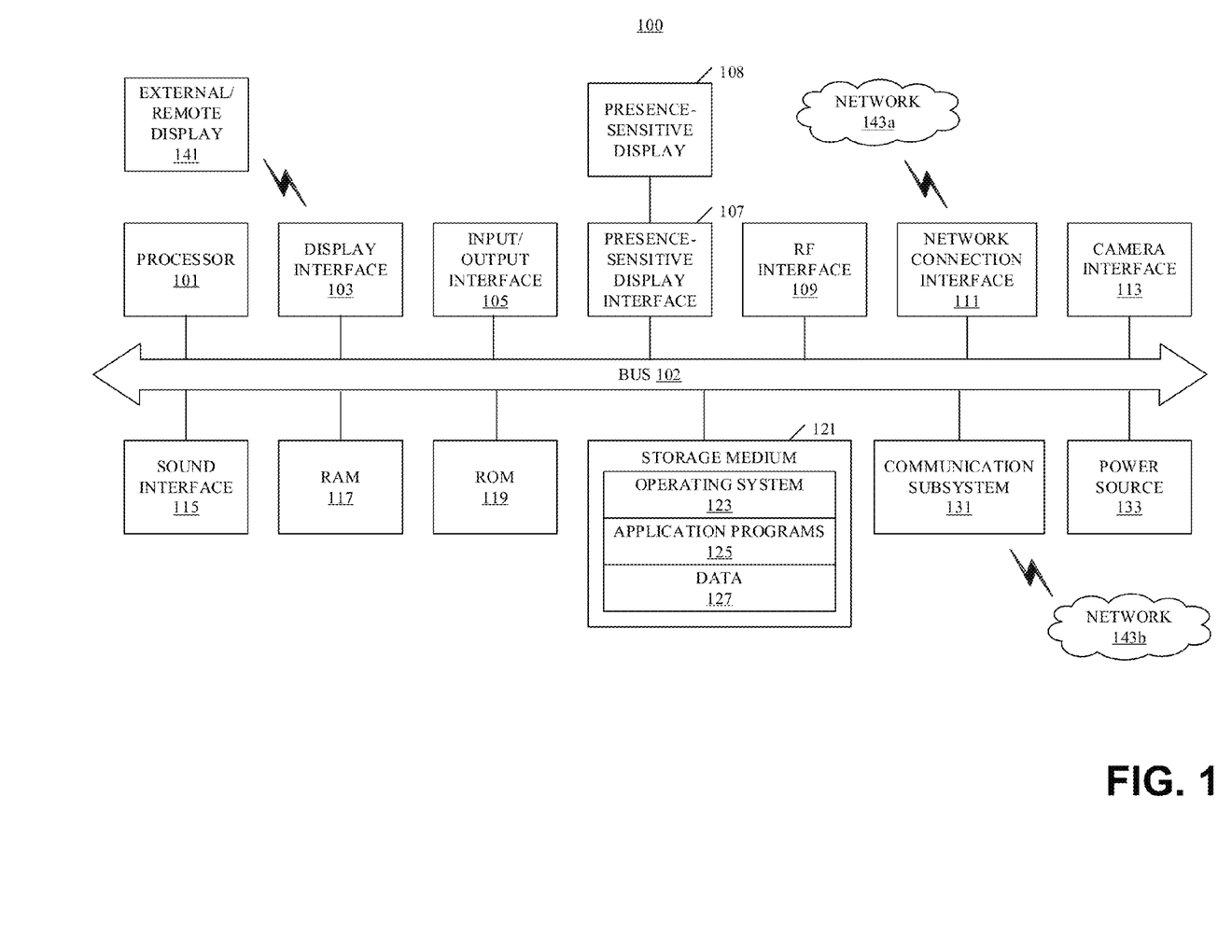
FIG. 1 is a block diagram illustrating an example implementation of a computing device, in accordance with various aspects set forth herein.

FIG. 1 is a block diagram illustrating an example implementation of a computing device 100, in accordance with various aspects set forth herein. In FIG. 1, the computing device 100 may be configured to include a processor 101 that is operatively coupled to a display interface 103, an input/output interface 105, a touch screen interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 103 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current implementation, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive display, a scroll wheel, a digital camera, a digital video camera, a web camera, a microphone, a sensor, a smartcard, and the like. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate to or associated with. In another definition, the term "near" is the extended spatial location of the display area. The RF interface 109 may be configured to provide a communication interface to RF components such as an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this implementation, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty eight (128) MBytes of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard are stored in a non-volatile memory device. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 includes cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

Figure 2A:
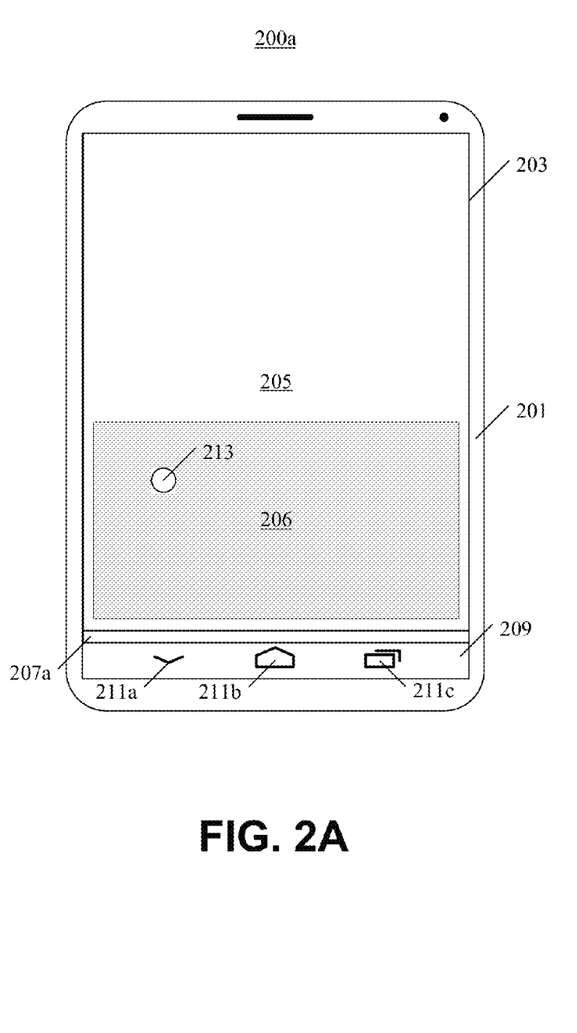
FIG. 2A-2B illustrate implementations of a front view of a computing device in portrait orientation with various aspects described herein.
Figure 2B:
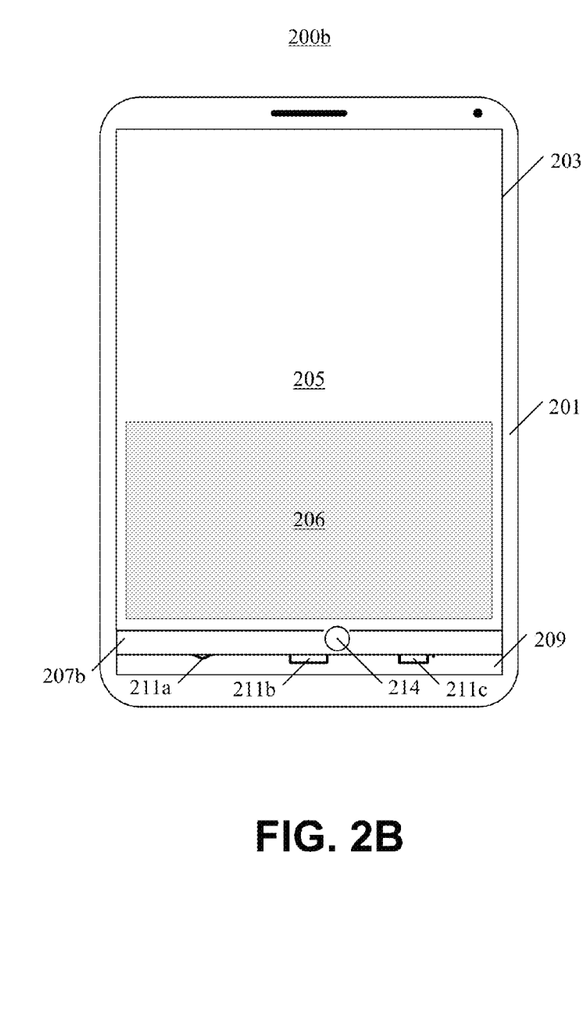

FIGS. 2A and 2B illustrate example implementations of a front view of a computing device 200 in portrait orientation with various aspects described herein. In FIG. 2, the computing device 200 may be configured to include a housing 201 and a presence-sensitive display 203. The housing 201 may be configured to house the internal components of the computing device 200 such as those described in FIG. 1 and may frame the presence-sensitive display 203 such that the presence-sensitive display 203 is exposed for user-interaction with the computing device 200. In one example, the presence-sensitive display 203 is used in a smartphone with, for instance, a display size of less than five inches diagonally. In another example, the presence-sensitive display 203 is used in a tablet computer with, for instance, a display size of less than eleven inches diagonally. It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications and variations that are within the spirit and scope of the claimed subject matter.

In FIGS. 2A and 2B, the computing device 200 may output, for display at the presence-sensitive display 203, a first region 205 of the presence-sensitive display 203, wherein the first region 205 has a first user interface object 206. For example, the first user interface object 206 may be a virtual keypad. In another example, the first user interface object 206 may be a hypertext link. In another example, the first user interface object 206 may be an action button. In another example, the first user interface object 206 may be a text input box. In another example, the first user interface object 206 may be a system icon such as a home button. In another example, the first user interface object 206 may be associated with controlling a game. In another example, the first user interface object 206 may be associated with controlling an application. The computing device 200 may output, for display at the presence-sensitive display 203, a second region 209 of the presence-sensitive display, wherein the second region 209 has a second user interface object 211a, 211b and 211c. For example, the second user interface object 211 may be a virtual keypad. In another example, the second user interface object 211 may be a hypertext link. In another example, the second user interface object 211 may be an action button. In another example, the second user interface object 211 may be a text input box. In another example, the second user interface object 211 may be a system icon such as a home button. In another example, the second user interface object 211 may be associated with controlling a game. In another example, the second user interface object 211 may be associated with controlling an application. The first region 205 may be adjacent or near to the second region 209. Further, a third region 207a and 207b may be interposed between the first region 205 and the second region 209. In one example, the third region 207a and 207b may be referred to as a dead zone.

In FIGS. 2A and 2B, the computing device 200 may receive, at the presence-sensitive display 203, a first presence indication 213 substantially within the first region 205 of the presence-sensitive display 203. In response to receiving the first presence indication 213, the computing device 200 may increase the size of the third region 207a to the third region 207b both of the presence-sensitive display 203 for a first dwell time. In one example, the computing device 200 may increase the size of the third region 207a to the third region 207b to substantially overlay the second region 309. In another example, the computing device 200 may increase the size of the third region 207a to the third region 207b to substantially overlay the second user interface elements 211a, 211b and 211c, so that the active area of each of the second user interface elements 211a, 211b and 211c is reduced. In another example, the computing device 200 may increase the size of the third region 207a to the third region 207b based on the location of the first presence indication 213. For example, the third region 207a and 207b is a dead zone. In another example, the third region 207a and 207b has no content. In another example, the third region 207a and 207b is made transparent. The third region 207a and 207b may not have any user-responsive, or interactive, user interface objects. Further, the third region 207a and 207b may overlay a portion of a second region 209. Also, the third region 207a and 207b may be adjacent to the first region 205. In one example, the first dwell time may be less than one (1) second. In another example, the first dwell time may be approximately three hundred and thirty-three (333) milliseconds or another time suitable to allow a user to immediately select a user interface object on the presence-sensitive display. The computing device 200 may receive, at the presence-sensitive display 203, a second presence indication 214 near the second user interface object 211b of the second region 209 and substantially within the third region 207b. Based on the second presence indication being substantially within the third region, the computing device may ignore a corresponding user input. Thus, in response to receiving the second presence indication 214, the computing device 200, may decline, or otherwise determine not to perform an action associated with the second user interface object 211b of the second region 209.

In another implementation, in response to receiving the second presence indication 214, the computing device 200 may output, for display at the presence-sensitive display 203, a third region indication associated with the third region 207a and 207b for a third dwell time. In one example, the third dwell time may be less than one (1) second.

In another implementation, in response to receiving the second presence indication 214, the computing device 200 may output an indication that it determined not to perform the action associated with the second user interface object of the second region. In one example, the indication is outputting an auditory indication to a speaker of the computing device 200. In another example, the indication is outputting a vibration of the computing device 200 using an actuator of the computing device 200.

In another implementation, the computing device 200 may increase, in response to receiving the first presence indication, the size of the third region 207a for a first dwell time so that the third region 207b covers all of the second region 209. By doing so, the computing device 200 may determine not to perform an action associated with any second user interface objects 211a, 211b and 211c of the second region 209.

In another implementation, the computing device 200 may associate the second presence indication 214 with the first region 205. Further, the computing device 200 may project the second presence indication 214 to the nearest user interface object of the first region 205. For example, the computing device 200 may project the second presence indication 214 vertically relative to the computing device 200 to the user interface object 206 of the first region 205. In another example, the computing device 200 may project the second presence indication 214 to the closest user interface object 206 of the first region 205. In another example, the computing device 200 may project the second presence indication 214 vertically relative to the computing device 200 to a key of a virtual keyboard in the first region 205.

In another implementation, the computing device 200 may output, for display at the presence-sensitive display, a fourth region on the presence-sensitive display 203, wherein the fourth region has a third user interface object. Further, in response to receiving the first presence indication 213, the computing device 200 may increase the size of a fifth region on the presence-sensitive display 205 for a fourth dwell time, wherein the fifth region overlays a portion of the fourth region on the presence-sensitive display 203, wherein the fourth region and the fifth region are adjacent to the first region 205 and not adjacent to the second region 309 and the third region 307. In one example, the fourth dwell time may be the same as the first dwell time. In another example, the fourth dwell time may be less than one (1) second. In another example, the fourth dwell time may be approximately three hundred and thirty-three (333) milliseconds or another time suitable to allow a user to immediately select a user interface object on the presence-sensitive display. The computing device 200 may receive, at the presence-sensitive display, a third presence indication near the third user interface object of the fourth region and substantially within the fifth region. In response to receiving the third presence indication, the computing device 200 may determine not to perform an action associated with the third user interface object of the fourth region.

In another implementation, after the fourth dwell time, the computing device 200 may decrease the size of the fifth region over a fifth dwell time. In one example, the fifth dwell time may be the same as the third dwell time. In another example, the fifth dwell time may be less than one (1) second. In another example, the fifth dwell time may be approximately three hundred and thirty-three (333) milliseconds or another time suitable to allow a user to immediately select a user interface object on the presence-sensitive display.

Figure 3A:
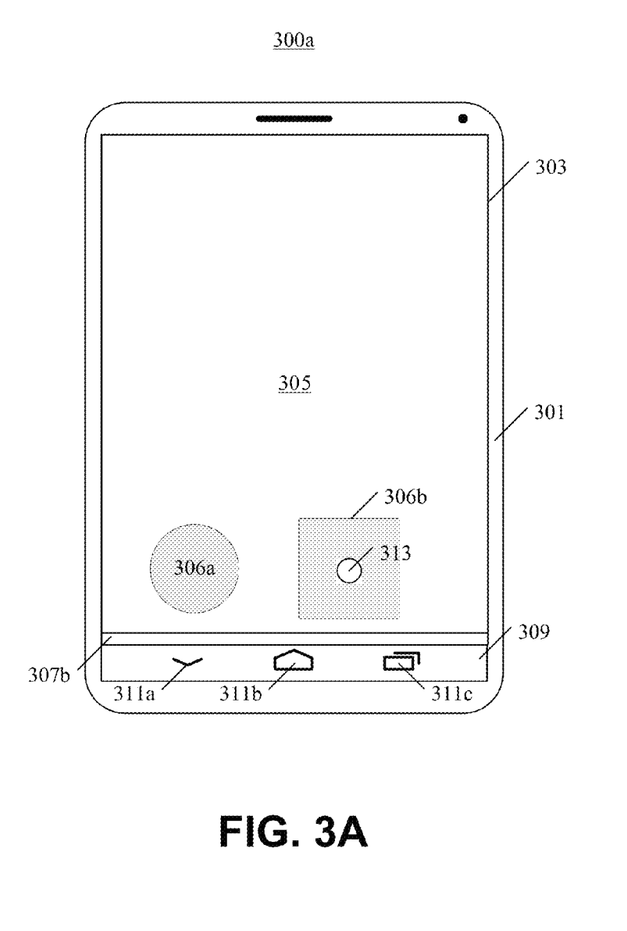
FIG. 3A-3B illustrate additional example implementations of a front view of a computing device in portrait orientation with various aspects described herein.
Figure 3B:
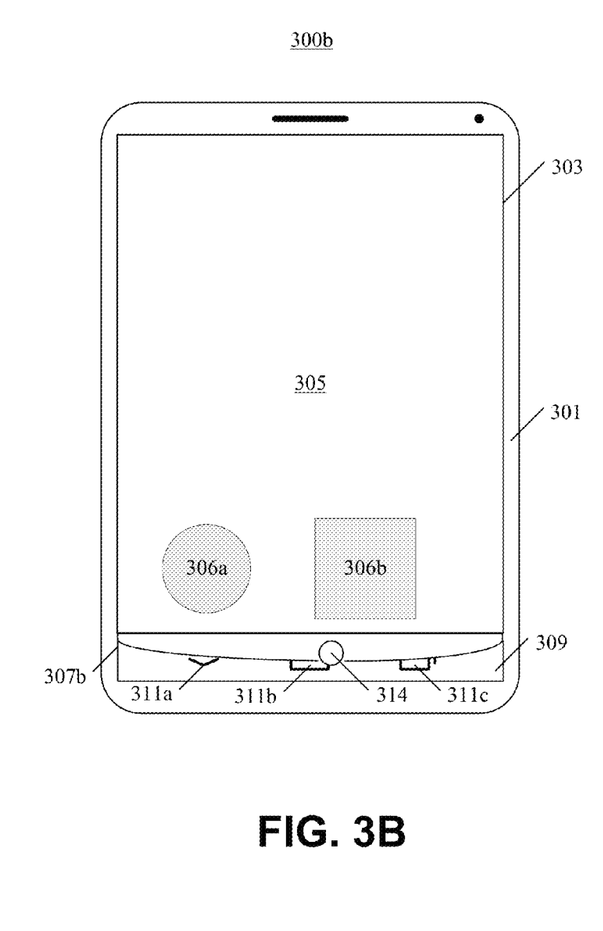

FIGS. 3A and 3B illustrate additional example implementations of a front view of a computing device 300 in portrait orientation with various aspects described herein. In FIG. 3, the computing device 300 may be configured to include a housing 301 and a presence-sensitive display 303. The housing 301 may be configured to house the internal components of the computing device 300 such as those described in FIG. 1 and may frame the presence-sensitive display 303 such that the presence-sensitive display 303 is exposed for user-interaction with the computing device 300. In one example, the presence-sensitive display 303 is used in a smartphone with, for instance, a display size of less than six (6) inches diagonally. In another example, the presence-sensitive display 303 is used in a tablet computer with, for instance, a display size of less than eleven (11) inches diagonally.

In FIGS. 3A and 3B, the computing device 300 may output, for display at the presence-sensitive display 303, a first region 305 of the presence-sensitive display 303, wherein the first region 305 has a first user interface object 306a and 306b. The computing device 300 may output, for display at the presence-sensitive display 303, a second region 309 of the presence-sensitive display, wherein the second region 309 has a second user interface object 311a, 311b and 311c. The first region 305 may be adjacent or near to the second region 309. Further, a third region 307a and 307b may be interposed between the first region 305 and the second region 309. In one example, the third region 307a and 307b may be referred to as a dead zone.

In the current implementation, the computing device 300 may receive, at the presence-sensitive display 303, a first presence indication 313 substantially within the first region 305 of the presence-sensitive display 303. In response to receiving the first presence indication 313, the computing device 300 may increase the size of a third region 307a to a third region 307b both of the presence-sensitive display 303 for a first dwell time. The third region 307a and 307b may not have any user interface objects. Further, the third region 307a and 307b may overlay a portion of a second region 309. Also, the third region 307a and 307b may be adjacent to the first region 305. In one example, the computing device 300 may adjust a shape of the third region 307a and 307b to conform to the shape of the second region 309. In another example, the computing device 300 may adjust a shape of the third region 307a and 307b based on the location of the first presence indication 313. The computing device 300 may receive, at the presence-sensitive display 303, a second presence indication 314 near the second user interface object 311b of the second region 309 and substantially within the third region 307b. In response to receiving the second presence indication 314, the computing device 300 may associate the second presence indication 314 with the first region 305. In response to receiving the second presence indication 314, the computing device 300 may determine not to perform an action associated with the second user interface object 311b of the second region 309. After the first dwell time, the computing device 300 may decrease the size of the third region 307b back to the size of the third region 307a.

Figure 4:
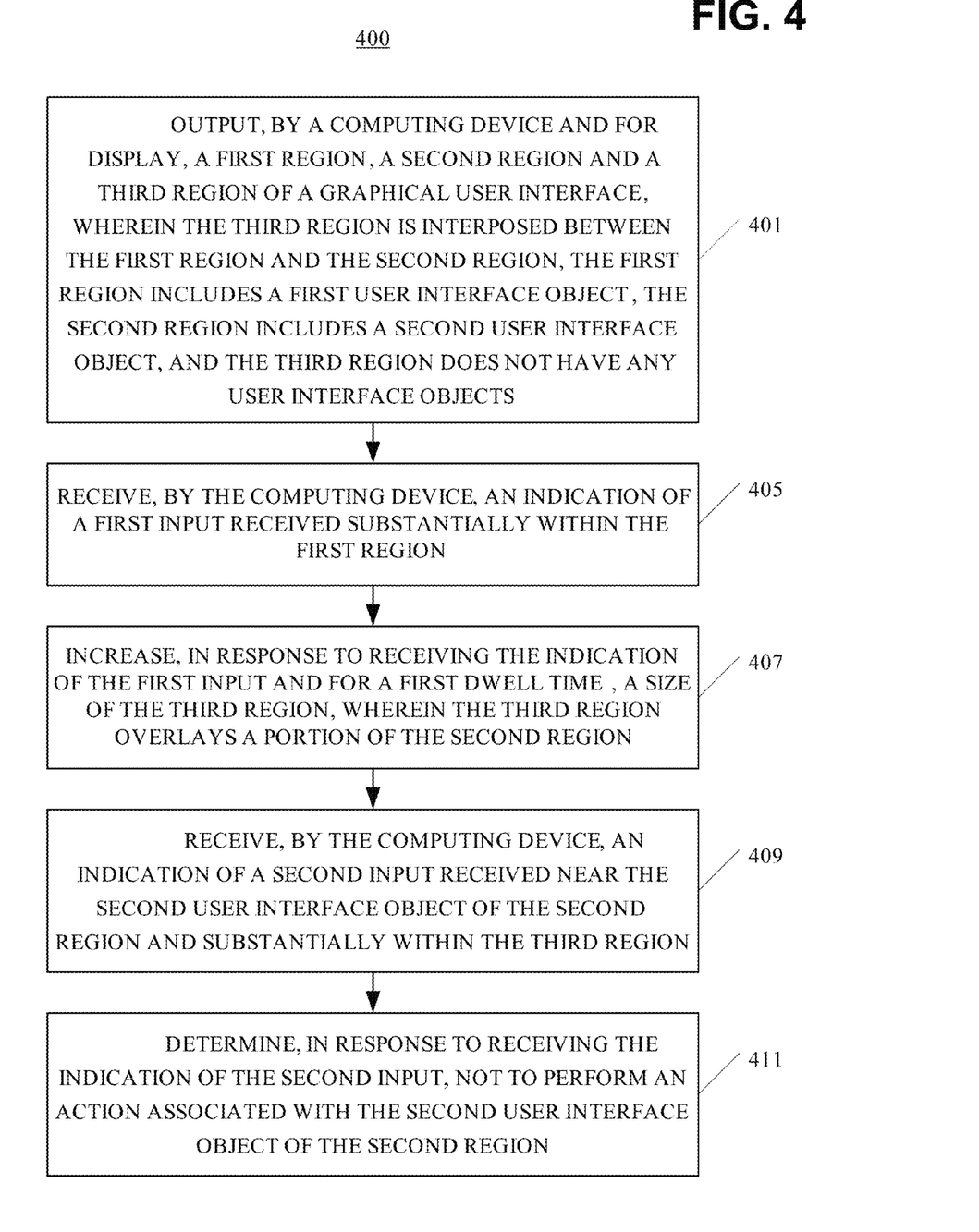
FIG. 4 is a flow chart illustrating an example implementation of a method for reducing entry errors in a graphical user interface with various aspects described herein.

FIG. 4 is a flow chart illustrating an example implementation of a method 400 for reducing entry errors in a graphical user interface with various aspects described herein. In FIG. 4, the method 400 may begin at, for instance, block 401, where it may output, by a computing device and for display, a first region, a second region and a third region of a graphical user interface, wherein the third region is interposed between the first region and the second region, the first region includes a first user interface object, the second region includes a second user interface object, and the third region does not have any user interface objects. At block 405, the method 400 may receive, by the computing device, an indication of a first input received substantially within the first region. At block 407, the method 400 may increase, in response to receiving the first indication of the first input and for a first dwell time, a size of the third region, wherein the third region overlays a portion of the second region. At block 409, the method 400 may receive, by the computing device, an indication of a second input received near the second user interface object of the second region and substantially within the third region. At block 411, the method 400 may determine, in response to receiving the indication of the second input, not to perform an action associated with the second user interface object of the second region.

Figure 5:
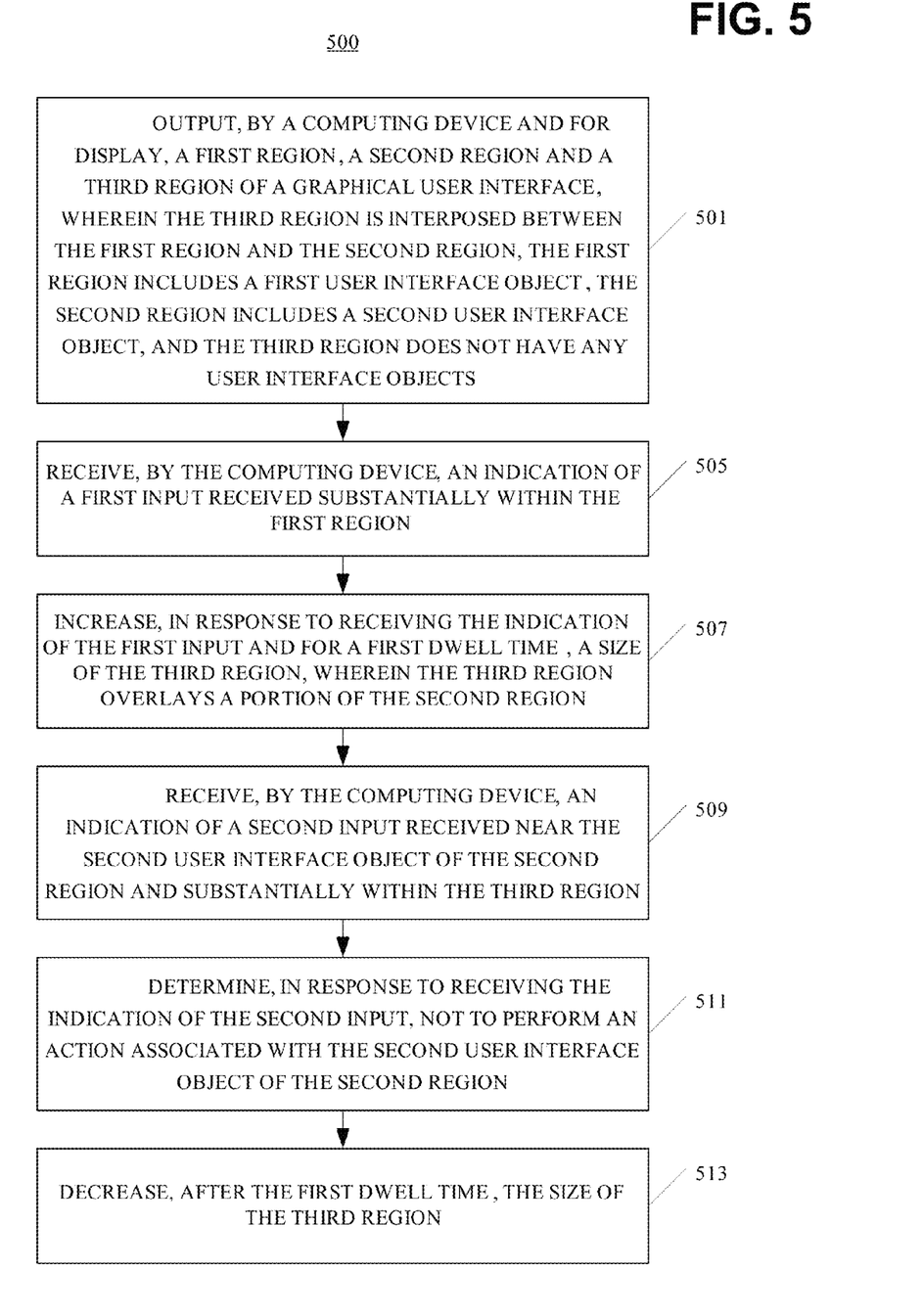
FIG. 5 is a flow chart illustrating another example implementation of a method for reducing entry errors in a graphical user interface with various aspects described herein.

FIG. 5 is a flow chart illustrating a another example implementation of a method 500 for reducing entry errors in a graphical user interface with various aspects described herein. In FIG. 5, the method 500 may begin at, for instance, block 501, where it may output, by a computing device and for display, a first region, a second region and a third region of a graphical user interface, wherein the third region is interposed between the first region and the second region, the first region includes a first user interface object, the second region includes a second user interface object, and the third region does not have any user interface objects. At block 505, the method 500 may receive, by the computing device, an indication of a first input received substantially within the first region. At block 507, the method 500 may increase, in response to receiving the first indication of the first input and for a first dwell time, a size of the third region, wherein the third region overlays a portion of the second region. At block 509, the method 500 may receive, by the computing device, an indication of a second input received near the second user interface object of the second region and substantially within the third region. At block 511, the method 500 may determine, in response to receiving the indication of the second input, not to perform an action associated with the second user interface object of the second region. At block 513, the method 500 may decrease, after the first dwell time, the size of the third region. In one example, the size of the third region can decrease over a second dwell time. In another example, the size of the third region can decrease linearly over a second dwell time. In one example, the second dwell time is the same as the first dwell time. In another example, the second dwell time can be less than a second. In another example, the second dwell time is approximately three hundred and thirty-three (333) milliseconds or another time suitable to allow a user to immediately select a user interface object on the presence-sensitive display.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications and variations that are within the spirit and scope of the claimed subject matter.

Although the present disclosure describes specific examples, implementations, and the like, various modifications and changes may be made without departing from the scope of the present disclosure as set forth in the claims below. For example, although the example methods, devices, systems, or articles of manufacture described herein are in conjunction with a configuration for the aforementioned performing configurable gestures in a graphical user interface, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, implementation, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific implementations are not intended to be construed as a critical, required, or essential feature or element of any or all of the claims. Any benefits, advantages, or solutions to problems that are described herein with regard to specific examples, implementations, or the like are not intended to be construed as a critical, required, or essential feature or element of any or all of the claims.

What is claimed is:

1. A method, comprising:
outputting, by a computing device and for display, a first region, a second region and a third region of a graphical user interface, wherein:
the third region is interposed between the first region and the second region,
the first region includes a first user interface object,
the second region includes a second user interface object and maintains a static position,
the third region is separate and distinct from the first and second regions,
the third region does not include any user interface objects, and
the third region is a dead zone;
receiving, by the computing device, an indication of a first input received substantially within the first region;
increasing, in response to receiving the indication of the first input and for a first dwell time, a size of the third region such that the third region overlays a portion of the second region without overlaying a portion of the first region;
receiving, by the computing device, an indication of a second input received near the second user interface object of the second region and substantially within the third region; and
determining, in response to receiving the indication of the second input and based on the second input being received substantially within the third region, not to perform an action associated with the second user interface object of the second region.

2. The method of claim 1, further comprising:
decreasing, after the first dwell time, the size of the third region.

3. The method of claim 2, wherein decreasing the size of the third region is performed over a second dwell time.

4. The method of claim 3, wherein decreasing the size of the third region is performed linearly over the second dwell time.

5. The method of claim 1, wherein the first user interface object is a virtual keyboard.

6. The method of claim 1, wherein the second user interface object is a graphical icon.

7. The method of claim 1, wherein the third region is transparent.

8. The method of claim 1, further comprising:
in response to receiving the second presence indication, outputting, for display at the presence-sensitive display, the third region for a third dwell time.

9. The method of claim 1, wherein not performing an action associated with the second user interface object of the second region comprises:
outputting, to a speaker of the computing device, an auditory indication.

10. The method of claim 1, further comprising:
associating the second presence indication with the first region; and
projecting the second presence indication to the nearest user interface object of the first region.

11. The method of claim 1, wherein the shape of the third region is associated with the shape of the second region.

12. The method of claim 1, wherein the shape of the third region is associated with the location of the first presence indication.

13. The method of claim 1, wherein the first dwell time and the second dwell time are each less than one second.

14. The method of claim 1, wherein the size of the third region is associated with the distance from the location of the first presence indication of the first region to the second region.

15. The method of claim 1, further comprising:
outputting, by the computing device for display, a fourth region and a fifth region on the graphical user interface, wherein the fifth region is interposed between the first region and the fourth region, wherein the fourth region has a third user interface object, wherein the fifth region does not include any user interface objects;
increasing, in response to receiving the first presence indication, the size of the fifth region for a fourth dwell time, wherein the fifth region overlays a portion of the fourth region;
receiving, by the computing device, a third presence indication near the third user interface object of the fourth region and substantially within the fifth region; and
determining, in response to receiving the third presence indication and based on the third presence indication being substantially within the fifth region, not to perform an action associated with the third user interface object of the fourth region.

16. The method of claim 15, further comprising:
decreasing, after the fourth dwell time, the size of the fifth region over a fifth dwell time.

17. The method of claim 1, wherein increasing the size of the third region for the first dwell time overlays all of the second region.

18. A device, comprising:
a presence-sensitive display;
a memory configured to store data and computer-executable instructions;
a processor operatively coupled to the memory and the presence-sensitive display, wherein the processor and memory are configured to:
output, for display, a first region, a second region and a third region of a graphical user interface, wherein:
the third region is interposed between the first region and the second region, the first region includes a first user interface object,
the second region includes a second user interface object and maintains a static position,
the third region is separate and distinct from the first and second regions,
the third region does not include any user interface objects, and
the third region is a dead zone;
receive an indication of a first input received substantially within the first region;
increase, in response to receiving the indication of the first input and for a first dwell time, a size of the third region such that the third region overlays a portion of the second region without the third region overlaying a portion of the first region;
receive an indication of a second input received near the second user interface object of the second region and substantially within the third region; and
responsive to receiving the indication of the second input and based on second input being substantially within the third region, determine to ignore the second input.

19. A non-transitory computer-readable medium encoded with a computer program, the computer program comprising computer-executable instructions that when executed by a processor cause the processor to:
output, by a computing device and for display, a first region, a second region and a third region of a graphical user interface, wherein:
the third region is interposed between the first region and the second region,
the first region includes a first user interface object,
the second region includes a second user interface object and maintains a static position,
the third region is separate and distinct from the first and second regions,
the third region does not include any user interface objects, and
the third region is a dead zone;
receive, by the computing device, an indication of a first input received substantially within the first region;
increase, in response to receiving the indication of the first input and for a first dwell time, a size of the third region such that the third region overlays a portion of the second region without the third region overlaying a portion of the first region;
receive, by the computing device, an indication of a second input received near the second user interface object of the second region and substantially within the third region; and
determine, in response to receiving the indication of the second input and based on the second input being received substantially within the third region, to decline to perform an action associated with the second user interface object of the second region.

20. The device of claim 18, wherein increasing the size of the third region for the first dwell time overlays all of the second region.

* * * * *